United States Patent [19]
Yates

[11] 3,864,407
[45] Feb. 4, 1975

[54] CATALYTIC PROCESS FOR PRODUCING HIGHER MOLECULAR WEIGHT

[75] Inventor: James E. Yates, Ponca City, Okla.

[73] Assignee: Continental Oil Company, Ponca City, Okla.

[22] Filed: June 6, 1973

[21] Appl. No.: 367,687

[52] U.S. Cl. ............ 260/642 C, 252/431, 260/430, 260/503, 260/505 R, 260/513 R, 260/642 R, 260/643 B, 260/643 D, 260/643 G, 260/681, 260/685.9
[51] Int. Cl. ...................... C07c 29/00, C07c 31/02
[58] Field of Search .................. 260/642 C

[56] References Cited
UNITED STATES PATENTS

| | | | |
|---|---|---|---|
| 1,992,480 | 2/1935 | Fuchs et al. | 260/642 C |
| 3,328,470 | 6/1967 | Poe | 260/642 C |
| 3,642,914 | 2/1972 | Mitchell | 260/642 C |

FOREIGN PATENTS OR APPLICATIONS

| | | | |
|---|---|---|---|
| 478,141 | 1/1938 | Great Britain | 260/642 C |
| 326,812 | 9/1931 | Great Britain | 260/642 C |
| 1,003,608 | 11/1951 | France | 260/642 C |

*Primary Examiner*—Joseph E. Evans
*Attorney, Agent, or Firm*—Ronald J. Carlson

[57] ABSTRACT

A process for producing higher molecular weight alcohols by condensing at least one lower molecular weight primary alkanol having a methylene group adjacent the hydroxylated carbon atom in liquid phase in the presence of an alkali catalyst and an organic silver compound, said alkali catalyst being an alkali metal alcoholate or a precursor thereof which forms the alcoholate in the reaction system and said organic silver compound being defined by

[I]

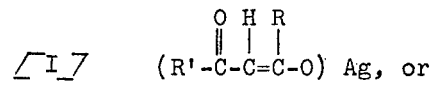

[II] $(R''-SO_3)Ag$ wherein R' and R" are each, independently, saturated or unsaturated, cyclic or acyclic, branch or straight chain hydrocarbon groups, while simultaneously removing water as it forms.

10 Claims, No Drawings

CATALYTIC PROCESS FOR PRODUCING HIGHER MOLECULAR WEIGHT

This invention relates to the condensation of primary and secondary alcohols to form alcohol products of higher molecular weight. More particularly, the invention relates to an improvement in the condensation of primary and secondary alcohols having a methylene group adjacent to the hydroxylated carbon atom to produce alcohols having a carbon content equal to the sum of the carbon atoms of the two reactant alcohols and which are branched at the beta carbon atom.

According to the well-known Guerbet reaction, a primary or secondary alcohol which contains a methylene group adjacent to the hydroxylated carbon atom may be condensed with itself or with another alcohol of the same class to form a higher alcohol containing the sum of the carbon atoms of the reactant alcohols as the principal product. The classic catalyst for the Guerbet reaction is a strong alkali such as sodium metal, which is generally in the form of its alcoholate during reaction, sodium and potassium hydroxides and the like. Many theories have been advanced as to the particular mechanism of the reaction (for example, see U.S. Pat. Nos. 2,004,350; 2,971,033; 2,829,177 and 3,558,716) and, as indicated in U.S. Pat. No. 2,762,847, there is little general agreement as to what reaction or reactions actually occur during transformation of the lower alcohols to the higher alcohols. It is further indicated that a plurality of different reactions are likely involved so that the process is highly sensitive and unpredictable as to the effect of particular catalysts.

The overall reaction, of course, produces a reaction reaction product mixture which not only contains the higher alcohols but also corresponding higher aldehydes and higher unsaturated alcohols and aldehydes as well as various other by-products due to side reactions. The higher aldehydes and higher unsaturated alcohols and aldehydes present little difficulty since upon hydrogenation of the reaction product they are converted to the desired higher alcohols. The other by-products which have been mentioned in the art include carboxylic acids as well as salts and esters thereof, and ordinarily it is desirable to minimize their formation. One technique for reducing by-products, which is suggested in U.S. Pat. No. 3,328,470, involves the use of less than 3 mol percent alkali catalyst and temperatures in the range of 200°–300°C while continuously removing water formed by the reaction. On the other hand, it is known that in achieving acceptable reaction rates relatively high temperatures (e.g. 290°C) and relatively large quantities of alkali catalyst must be employed, but under these conditions considerable unwanted by-products are also obtained. Thus, it was necessary to balance the reaction rate against the tolerable by-products in the standard Guerbet reaction.

Considerable activity has been involved in developing various approaches to attempt to improve the reaction rate of this process and, at the same time, reduce or at least not increase the by-products. Among the various approaches attempted are the use of certain phosphates as co-catalysts (U.S. Pat. No. 2,762,847); the use of a particular combination catalyst mixture made up of potassium carbonate, magnesium oxide and copper chromite (U.S. Pat. No. 2,971,033); and the use of certain compounds of platinum, palladium, ruthenium and rhodium (U.S. Pat. Nos. 3,479,412 and 3,514,493).

In addition, much effort has been placed on the use of dehydrogenation catalysts, apparently based on the theory that the alcohol reactant is initially dehydrogenated before condensation in the Guerbet reaction and that, by catalyzing this dehydrogenation, the overall reaction rate will be increased (see French Pat. No. 784,656; German Pat. No. 734,468; U.S. Pat. Nos. 2,457,866; 2,757,139 and 2,836,628). Among the dehydrogenation catalysts described in these patents are various compounds of copper, zinc and nickel. These materials along with iron, aluminum, chromium, silver and magnesium are also mentioned in German Pat. Nos. 748,040; 911,730 and 855,108.

Illustrating the empirical nature of catalyzing the reaction is U.S. Pat. No. 2,829,177 wherein ferric ions are used to promote the alkali catalyzed condensation while other closely related materials, such as ferrous ions, are ineffective or insufficiently effective to warrant being used.

In accordance with this invention, it has unexpectedly been found that a significantly improved reaction rate may be obtained or, alternatively, significantly milder reaction conditions (temperature, pressure) may be employed in the Guerbet reaction of primary alkanols having methylene groups adjacent the hydroxylated carbon atoms by carrying out the reaction in the presence of certain organic silver compounds. Not only is the reaction rate improved but the selectivity of the overall process is substantially maintained as indicated by the hydrogenated product. Moreover, as previously mentioned, it is customary to hydrogenate the reaction product as a whole to convert the higher aldehydes and higher unsaturated alcohols and aldehydes to the corresponding higher alcohol products. With reaction products produced from mixtures of alcohol reactants by the standard Guerbet reaction, that is, the simple alkali catalyzed condensation of the alcohols, it has been found that upon hydrogenation a product is produced which contains significant quantities of mixed paraffins some of which have boiling points similar to those of the desired higher alcohol products and thus cannot be separated by the usual distillation techniques. It is believed that these paraffins are the result of dimeric dienes produced as by-products during the condensation reaction. With the present invention there is a reduction in the quantity of these paraffins in the hydrogenated reaction product which is the direct result of a reduction in the amount of dimeric dienes produced during the condensation reaction. This enables one to produce a higher alcohol product having greater purity by standard distillation techniques. However, it is emphasized that the selectivity of the process remains substantially unaltered in that apparently, while the precursors for the paraffins (dimeric dienes) are reduced, there is a corresponding increase in other by-products which are readily separable upon distillation. Thus, while the selectivity of the process remains substantially the same insofar as the desired higher alcohol products and compounds convertible to the same upon hydrogenation are concerned, the distribution of the types of by-products is altered in favor of increasing the quantity of readily separable high boiling by-products against the more difficult to separate by-products (paraffins) after hydrogenation of the reaction product.

In describing the invention in detail, the alkanols which may be used are primary or secondary alkanols having methylene groups adjacent the hydroxylated carbon atoms. These alkanols may best be illustrated by the formula $$R-CH_2-\underset{R°}{CHOH}$$

wherein each of R and R° can be hydrogen or a straight or branch chain alkyl group. Preferably, R is an alkyl group and R° is hydrogen. While there is no limitation as to the number of carbon atoms the alkyl groups may contain from a theoretical standpoint, more practical considerations indicate that such alkyl groups most likely will contain about 1 to 28 carbon atoms. Thus, the most preferred alkanols are those which are branch or straight chain, have 2 to 30 carbon atoms and have a methylene group adjacent to the hydroxylated carbon atom. Illustrative of these alkanols are 1-butanol; isopropyl alcohol; 1-octanol; 1-hexadecanol; 1-octadecanol; 1-eicosanol; 1-dodecanol; 1-hexacosanol; 4-methyl-pentanol-2; octanol-2; 1-tetracosanol; 1-pentanol; 1-tetradecanol; 3,3-dimethyl-1-butanol; 4-methyl-1-pentanol; 4-methyl-1-heptanol; 3-methyl-1-heptanol, 3,3-dimethyl-1-heptanol; 3,3-dimethyl-1-hexanol; 4,4-dimethyl-1-heptanol; 4,4-dimethyl-1-hexanol; 3,4-dimethyl-1-heptanol; 3,4-dimethyl-1-hexanol; and the like. The alcohols may be reacted in their pure form or as mixtures. In particular, alcohol mixtures such as those generally referred to as "Oxo" alcohols having methylene groups adjacent to the hydroxylated carbon atoms are suitable as are mixtures of linear alcohols.

The above-described alkanols are reacted in the presence of an alkali catalyst as is well-known and heretofore described in the literature relative to the Guerbet reaction. These alkali catalysts include the alkali metals, alkali metal hydroxides, alkali metal oxides and alkali metal alcoholates. The metals, hydroxides and oxides will, of course, form the alcoholates in the reaction system wherein the hydrocarbon moieties of the alcoholate correspond to the hydrocarbon moieties of the alcohol reactants. When preformed alkali metal alcoholates are used it is not necessary that they correspond with the alcohol reactants. Illustrative of suitable alkali catalysts are metallic sodium or potassium, lithium hydroxide, sodium hydroxide, potassium hydroxide, sodium oxide, potassium oxide, sodium alcoholates, potassium alcoholates, and the like. Obviously other alkali metal compounds may be used provided that they will form the corresponding alcoholates under reaction conditions. Such compounds include the alkali metal bisulfites.

The amount of alkali catalyst employed forms no part of this invention and the effects of various quantities of such catalyst are known in the art. Since large quantities of alkali catalyst lead to increased amounts of unwanted by-products and since good reaction rates are achieved by the improvement of this invention with low levels of alkali catalyst, it is normally not desirable nor is it necessary to exceed an amount of alkali catalyst equivalent to about 4 mols of the alkali metal per 100 mols of alcohol reactants. Generally, an amount of alkali catalyst equivalent to about 0.1 to 4 mols of the alkali metal per 100 mols of alcohol reactants may be employed with satisfactory results, with preferred amounts being equivalent to about 0.5 to 4 mols of the alkali metal on the same basis.

As mentioned hereinbefore, the improvement of this invention involves carrying out the condensation reaction of the above-described alkanols catalyzed by the above-described alkali catalysts in the presence of certain organic silver compounds. The organic silver compounds contemplated are salts of certain β-diketones and sulfonic acids and are defined by the following structures:

[I]   $(R'-\underset{\underset{}{\|}}{\overset{O}{C}}-\overset{H}{\underset{}{C}}=\overset{R'}{\underset{}{C}}-O)$ Ag, and

[II]   $(R''-SO_3)$ Ag

In each of the above structures, R' and R'' are, independently, saturated or unsaturated, cyclic or acyclic, branch or straight chain hydrocarbon groups. Mixtures of such salts may be used.

The organic silver compounds defined by structure [I] above include those compounds wherein each R', independently, has 1 to 10 carbon atoms. Illustrative of these compounds are silver salts of β-diketones such as 2,4-pentane-dione (commonly referred to as silver acetylacetonate); 2,4-heptanedione; 3,5-heptanedione; 2,6-dimethyl-3,5-heptanedione; 2,4-nonanedione; 3,5-nonanedione; 4,6-nonanedione; 5,7-undecanedione; 2,2,6,6-tetramethyl-3,5-heptanedione; 1,3-diphenyl-1,3-propanedione; and the like.

The organic silver compounds defined by structure [II] above include those compounds wherein R'' has 6 to 54 carbon atoms. Illustrative of these compounds are silver salts of p-toluene sulfonic acid; naphthalene-β-sulfonic acid; benzene sulfonic acid; alkyl and dialkylbenzene sulfonic acids wherein the alkyl groups have 2 to 24 carbon atoms such as dodecylbenzene sulfonic acid, octylbenzene sulfonic acid, didodecylbenzene sulfonic acid, decylbenzene sulfonic acid, hexadecylbenzene sulfonic acid, ditetradecylbenzene sulfonic acid, dinonylbenzene sulfonic acid, heptadecyl sulfonic acid, dibutylbenzene sulfonic acid and tridecylbenzene sulfonic acid; sulfonic acids derived from monoolefins (both 1-olefins and pendent olefins), preferably olefins having 8 to 30 carbon atoms, such as 1-dodecene sulfonic acid, 1-eicosene sulfonic acid, 2-heptene sulfonic acid, 1-pentadecene sulfonic acid, 2-tridecene sulfonic acid and 1-tetradecene sulfonic acid (it is understood that these sulfonic acids derived from mono-olefins may be in admixture with hydroxyalkane sulfonic acids as described in U.S. Pat. No. 3,409,647 all of which will form silver salts); alkyl sulfonic acids wherein the alkyl group has 6 to 30 carbon atoms such as decyl sulfonic acid; dodecyl sulfonic acid; 2-ethylhexyl sulfonic acid; heptadecyl sulfonic acid; pentadecyl sulfonic acid and tridecyl sulfonic acid; cyclohexyl sulfonic acid; and the like.

The above silver compounds may be employed as such or in solution with an inert organic solvent such as paraffins, olefins, benzene, toluene, and the like.

Catalytic amounts of the above-defined organic silver compounds are employed in the improved Guerbet reaction of this invention. Generally, this will be an amount sufficient to provide at least 10 ppm silver metal based on the alkanol reactants. While there is, theoretically, no upper limit on the quantity of silver which may be present it is pointed out that very high quantities (e.g. 5,000 ppm) may interfere with the alkali catalyst necessitating the use of greater quantities of the alkali catalyst than would normally be required to achieve the desired reaction parameters. Without intending to limit the invention in any way, it is preferred to employ about 50 to 200 ppm silver metal based on the alkanol reactants.

The improved reaction can generally be carried out over a wide range of temperatures similarly as is known in connection with Guerbet reactions. These temperatures will usually range from about 80°C to about 300°C, preferably from about 200°C to about 300°C. The particular temperature employed will depend upon the alkanol reactants, the particular alkaline condensing agent employed and other operating considerations as understood in the art.

It is essential that water produced from the condensation reaction be removed as the reaction progresses, otherwise, the oxidation of the alcohols to carboxylic acids will be increased with a corresponding loss in alkali catalyst through subsequent neutralization of the acids. As indicated in the prior art, water removal from the Guerbet reaction may be effected by employing a dehydrating agent such as calcium oxide or magnesium oxide. However, it is preferred to remove water by azeotropic distillation. The latter procedure is particularly advantageous in the condensation of low molecular weight alcohol while operating under atmospheric and super-atmospheric pressure.

In the improved process of the invention, it is generally desirable to employ alkali catalysts which contain a minimum of water since any water introduced with the catalyst must be subsequently removed during reaction as pointed out above. This is not to say that no water can be so introduced and in some cases it may be very advantageous from a materials handling point of view to add the alkali catalyst in the form of a reasonably concentrated aqueous solution. It is also mentioned that the effectiveness of a given quantity of silver catalyst may decrease, somewhat when employing aqueous solutions.

Except as the above considerations may influence the conduct of the reaction, pressure is not an essential aspect of the process. However, it is desirable to maintain the reactants in a liquid state and thus sufficient pressure will be employed where necessary to achieve this physical state.

As indicated previously, inert diluents may be employed in the reaction as desired. Such diluents include hydrocarbons such as paraffins, olefins, benzene, toluene, xylene, etc.

As previously described, the reaction product from the condensation reaction will generally contain, in addition to the higher molecular weight saturated alcohols, higher molecular weight aldehydes and higher molecular weight unsaturated alcohols and aldehydes as well as certain minor amounts of other by-products. Because of the presence of the aldehydes and unsaturated alcohols and aldehydes, it is generally desirable to hydrogenate the reaction product before recovering the product alcohols. This will have the effect of converting the higher molecular weight aldehydes and unsaturated alcohols and aldehydes to the product alcohols and thus increase the overall yield of the desired product.

In recovering the product alcohols from the hydrogenated reaction product, conventional distillation techniques may be employed whereby unreacted lower molecular weight alcohols will first be separated followed by the product alcohols with the higher boiling by-products remaining behind in the distillation bottoms. As indicated previously, when employing a single alkanol reactant any dimeric diene present in the reaction product will be converted to the corresponding paraffin upon hydrogenation and will be separated from the product higher alcohols through distillation. However, when a mixture of alcohol reactants are employed some of the dimeric dienes converted to paraffins upon hydrogenation will not be readily separable from the product higher alcohols by simple distillation due to the similarity in boiling points. This emphasizes again one of the previously mentioned advantages of the process of this invention when using mixed alkanol reactants wherein the distribution of by-products in the Guerbet reaction is shifted from the dimeric dienes to the higher boiling by-products. By reducing the amount of dimeric dienes in the Guerbet reaction product there results a decreased content of the contaminating paraffins in the product mixed alcohols after hydrogenation and recovery by distillation.

The invention will be further illustrated by the following illustrative examples:

EXAMPLE 1

Comparative experiments were conducted to demonstrate the effectiveness of the improvement of the invention in significantly reducing reaction time while retaining relatively mild reaction conditions for the Guerbet reaction and in altering the distribution of by-products while substantially maintaining the selectivity of the process in producing higher alcohols and the higher saturated aldehydes, unsaturated aldehydes and unsaturated alcohols convertible to the higher alcohols upon simple hydrogenation.

The control experiment was conducted by charging 250 g (1.58 mol) of 1-decanol and 2.1 g (0.0318 mol) KOH pellets (85% KOH, 15% water) to a 500 ml three-necked flask equipped with a Dean-Stark azeotrope trap and reflux condenser, thermometer and stirrer. The reaction mixture was heated to reflux temperatures and maintained at reflux until about 8 ml water was produced and collected. This represented about 50% conversion of the 1-decanol, 1 ml water derived from the KOH pellets and 7 ml water from the condensation reaction. The time required to produce the last 7 ml of water was about 7.25 hours. The crude reaction mixture was acid washed with 25% $H_2SO_4$ followed by water washing to remove the alkali catalyst. After removing the water the entire reaction mixture was analyzed by gas chromatography which indicated about 51% by weight conversion of the 1-decanol. The reaction product analyzed as about 93% by weight saturated alcohol having 20 carbon atoms and alcohol precursor having 20 carbon atoms (saturated aldehyde and unsaturated aldehyde and alcohol), about 5% by weight dimeric diene having 20 carbon atoms and about 2% by weight higher boiling by-products.

In an experiment demonstrating the invention, the above procedure was carried out additionally including 0.25 g of a solution of silver (mixed $C_{10} - C_{14}$) dialkyl benzene sulfonate in 80 pale oil (10.5% Ag), an amount sufficient to provide about 100 ppm silver based on the 1-decanol. The reaction time to produce the last 7 ml of water was noted to be about 65 minutes. After work up of the crude reaction mixture as described in the previous experiment gas chromatography analysis was performed which showed about 58% by weight conversion of 1-decanol with the reaction product comprising about 93% by weight saturated alcohol having 20 carbon atoms and alcohol precursor having 20 carbon atoms, about 2% by weight dimeric diene having 20 carbon atoms and about 5% by weight higher boiling by-products.

It is pointed out that the reaction products indicated in Table I, upon hydrogenation, will result in a total desired product alcohol having 20 carbon atoms which will equal the amount of $C_{20}$ alcohol and $C_{20}$ alcohol precursor as listed. The diene will be converted to the corresponding paraffin having 20 carbon atoms. It is evident, on this basis, that the total selectivity to desired products ($C_{20}$ alcohol and $C_{20}$ alcohol precursor) remains substantially the same for each experiment. However, the dimeric diene content is markedly reduced in the unwanted by-products.

TABLE I

| | | Reaction Product | | | |
|---|---|---|---|---|---|
| Ag (ppm) | Reaction Time | Conversion (wt%) | $C_{20}$ Alcohol and Precursor[b] (wt%) | Diene (wt%) | HB[c] (wt%) |
| 0 | 7.25 hr | 51 | 93.0 | 5.0 | 2.0 |
| 100[a] | 65 min | 58 | 93.0 | 2.0 | 5.0 |

[a] provided by silver (mixed $C_{10} - C_{14}$) dialkyl benzene sulfonate
[b] includes saturated aldehyde and unsaturated aldehyde and alcohol
[c] readily separable higher boiling by-products

EXAMPLE 2

The procedure for carrying out the process of the invention as described in Example 1 was followed except that the KOH pellets were introduced to the 1-decanol first and the mixture was heated to reflux. Reflux conditions were maintained until about 1 ml of water was removed, thus forming the potassium alkoxide, whereupon 0.25 g of the silver dialkyl benzene sulfonate solution was injected and refluxing continued with removal and collection of water as it formed. The time required to collect about 7 ml of water, evidencing about 50% conversion of the alkanol, was 66 minutes.

After work up of the crude reaction mixture gas chromatography analysis was performed showing a conversion of about 56% by weight with the reaction product comprising about 94% by weight saturated alcohol having 20 carbon atoms and alcohol precursor having 20 carbon atoms, about 1% by weight dimeric diene having 20 carbon atoms and about 5% by weight higher boiling by-products.

EXAMPLE 3

Similar results as described in Example 2 may be obtained employing a mixture of $C_6$-$C_{10}$ primary alkanols, sodium hydroxide and silver (mixed $C_{10}$-$C_{14}$) alkyl benzene sulfonate in the reaction mixture.

EXAMPLE 4

Similar results as described in Example 2 may also be obtained with a mixture of $C_{16} - C_{20}$ primary alkanols, metallic sodium and the silver salt of benzene sulfonic acid or the silver salt of 1-dodecene sulfonic acid.

EXAMPLE 5

Similar results as described in Example 2 may be obtained with 4-methyl-pentanol-2, potassium hydroxide and the silver salt of p-toluene sulfonic acid or the silver salt of dodecyl sulfonic acid.

EXAMPLE 6

Similar results as described in Example 2 may be obtained with 1-decanol or 1-dodecanol, potassium hydroxide and silver acetylacetonate.

EXAMPLE 7

The procedure according to the invention, as described in Example 1, was carried out except that 3.9 g of 45% aqueous KOH solution were employed for the KOH pellets. The time required to collect the last 7 ml of water was noted as about 4 hours and 6 minutes. After work up, gas chromatographic analysis of the reaction product indicated about 50% conversion with about 94% by weight of saturated alcohol having 20 carbon atoms and alcohol precursor having 20 carbon atoms, about 3% by weight of dimeric diene having 20 carbon atoms and about 3% by weight of higher boiling by-products.

Thus having described the invention in detail it will be understood by those skilled in the art that certain modifications and variations may be made without departing from the spirit and scope of the invention as described herein and in the appended claims.

I claim:

1. A process for producing higher molecular weight hydrocarbon alcohols by condensing at least one lower molecular weight alkanol having a methylene group adjacent to the hydroxylated carbon atom; said process being carried out in liquid phase at about 80° to about 300°C in the presence of an alkali catalyst and a catalytic amount of an organic silver compound while simultaneously removing water as it forms; said alkali catalyst being an alkali metal, alkali metal hydroxide, alkali metal oxide, alkali metal bisulfite or alkali metal hydrocarbon alcoholate; and said organic silver compound being defined by

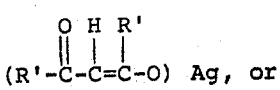

(R''—SO$_3$) Ag wherein R' and R'' are each, independently, a saturated or unsaturated, cyclic or acyclic, branch or straight chain hydrocarbon group.

2. A process according to claim 1 wherein each R', independently, has 1 to 10 carbon atoms.

3. A process according to claim 2 wherein the silver compound is silver acetylacetonate.

4. A process according to claim 2 wherein the silver compound is the silver salt of 3,5-heptanedione, the silver salt of 1,3-diphenyl-1,3-propanedione, the silver salt of 4,6-nonanedione, or the silver salt of 5,7-undecanedione.

5. A process according to claim 1 wherein R'' has 6 to 54 carbon atoms.

6. A process according to claim 5 wherein the silver compound is silver ($C_2$–$C_{24}$ alkyl) benzene sulfonate, silver di($C_2$–$C_{24}$ alkyl) benzene sulfonate, silver ($C_8$–$C_{30}$) alkylene sulfonate, silver ($C_6$–$C_{30}$) alkyl sulfonate, silver p-toluene sulfonate, silver napthalene $\beta$-sulfonate, or silver benzene sulfonate.

7. A process according to claim 1 wherein the alkali catalyst is sodium hydroxide, potassium hydroxide, sodium alcoholate, potassium alcoholate, metallic sodium, or metallic potassium.

8. A process according to claim 7 wherein the alkali catalyst is employed in an amount equivalent to about 0.1 to 4 mols of the alkali metal per mol of alkanol.

9. A process according to claim 8 wherein the silver compound is employed in an amount sufficient to provide at least 10 ppm silver metal based on the alkanol.

10. A process according to claim 1 wherein the lower molecular weight alkanol is a mixture of alkanols.

* * * * *